United States Patent [19]

Delau et al.

[11] Patent Number: 4,995,313

[45] Date of Patent: Feb. 26, 1991

[54] COOKING APPARATUS

[75] Inventors: William D. Delau, Royalton; James Garman, Wickliffe; Kevin Keith, Cleveland, all of Ohio

[73] Assignee: Welbilt Corporation, New Hyde Park, N.Y.

[21] Appl. No.: 168,401

[22] Filed: Mar. 15, 1988

[51] Int. Cl.⁵ .................. F24D 1/00; F24N 1/10; A21B 1/08; A01J 11/04
[52] U.S. Cl. ...................... 99/467; 126/197; 99/337; 99/483
[58] Field of Search .............. 70/91, 93; 99/337, 467, 99/473, 474, 483, 492; 292/DIG. 69; 134/570 DL, 580 DT; 126/374, 388, 197, 369; 426/510, 511

[56] References Cited

U.S. PATENT DOCUMENTS

| 1,621,736 | 3/1927 | Middleton . | |
|---|---|---|---|
| 1,976,423 | 10/1934 | Wallace . | |
| 2,140,166 | 12/1934 | Reeve | 426/511 X |
| 2,634,749 | 4/1953 | Cone | 99/337 X |
| 3,291,030 | 12/1966 | Arnold . | |
| 3,327,690 | 6/1967 | Higgins . | |
| 3,328,062 | 6/1967 | Geiger et al. | 292/DIG. 69 X |
| 3,364,845 | 1/1968 | Wilson et al. | 99/337 X |
| 3,473,693 | 10/1969 | Fritz | 292/DIG. 69 X |
| 3,604,895 | 9/1969 | MacKay . | |
| 3,680,531 | 8/1972 | Holdt . | |
| 3,872,920 | 3/1975 | Honma et al. . | |
| 3,951,131 | 4/1976 | Houfek | 426/511 X |
| 3,959,506 | 5/1976 | Kunz | 426/511 X |
| 3,972,984 | 11/1976 | Treiber | 426/511 X |
| 4,011,805 | 3/1977 | Vegh et al. . | |
| 4,038,432 | 7/1977 | Hildebolt et al. | 426/511 |
| 4,163,443 | 8/1979 | Peterson | 292/DIG. 69 X |
| 4,222,322 | 9/1980 | van der Schoot | 99/467 |
| 4,281,636 | 8/1981 | Vegh et al. . | |
| 4,664,429 | 5/1987 | Notaro et al. | 292/DIG. 69 X |
| 4,700,685 | 10/1987 | Miller | 426/510 X |
| 4,823,767 | 4/1989 | Wust | 99/467 X |

FOREIGN PATENT DOCUMENTS

| 2424280 | 12/1974 | Fed. Rep. of Germany | 134/57 DL |
|---|---|---|---|
| 2469898 | 6/1981 | France | 99/337 |
| 348799 | 9/1960 | Switzerland | 94/337 |
| 2181177 | 4/1987 | United Kingdom | 292/DIG. 69 |

Primary Examiner—Frankie L. Stinson
Attorney, Agent, or Firm—Watts, Hoffmann, Fisher & Heinke

[57] ABSTRACT

A steam processor capable of operating in a convection or a pressure mode. The processor includes at least one insulated cooking chamber having an access door for gaining access to the interior, a steam inlet for introducing steam into the chamber and a steam outlet for discharging excess steam and condensate. A drain manifold connects the steam outlet to an ambient drain and includes a fluid pressure operated pinch valve for terminating communication of the steam outlet with the drain in order to place the cooking chamber in a pressure mode. A latch mechanism maintains closure of the access door as long as the cooking chamber is under pressure and includes a solenoid operated locking bar which blocks movement in a door opening latch member. A pressure responsive actuator monitors pressure in the cooking chamber and maintains the locking bar in its blocking position as long as the pressure in the cooking chamber is above a determined level, even if power is interrupted to the steam processor.

35 Claims, 4 Drawing Sheets

COOKING APPARATUS

TECHNICAL FIELD

The present invention relates generally to cooking apparatus and methods and in particular, to a steam cooker that is operable in a convection mode or a pressure mode.

BACKGROUND ART

A steam cooker generally consists of the cooking chamber and a source of steam. Heat from the steam transfers directly to food items placed in the cooking chamber.

Cooking food in the presence of steam has been found to be very efficient and to have a minimal effect on taste, texture, color and other characteristics of the food. The moist cooking environment provided by the steam, inhibits the dehydration of the food being processed. Dehydration is often a problem in radiated heat and convection air type ovens.

Two types of steam processors are generally available today. One type of processor operates in a convection mode in which steam is introduced into a cooking compartment and condensate is allowed to leave the compartment through a drain, generally maintained at ambient pressure. In this type of processor, the cooking compartment is maintained at substantially atmospheric pressure and the low pressure steam circulates around the food trays.

In another type of steam processor, the cooking/heating of the food items occurs under pressure. In this type of processor, the cooking cabinet is sealed and the steam is introduced into the compartment under pressure. Generally, the compartment is pressurized in the range of 10psi.

With a convection type steamer, the door can be opened at any time during the cooking process to visually check the food being processed. With a pressure-type steamer, the cooking time for a given item is generally reduced. However, because the cabinet is maintained under pressure, the door must be locked and sealed until the end of the cooking cycle. It has also been found that certain items and/or certain operators prefer convection type steamers for certain food items and pressure-type steamers for other items.

DISCLOSURE OF INVENTION

The present invention provides a new and improved steam processor which is capable of operating in steam convection and steam pressure modes. The disclosed processor is switched between the modes by the operator using simple operator controls and does not require substantial setup time or readjustment.

According to the invention, the processor includes at least one cooking chamber having a steam inlet and an outlet for discharging steam and condensate. A cooking chamber door provides access to the interior of the chamber and sealingly engages structure defining a cooker opening. The apparatus is connected to a source of steam which may be available at the operating site or alternately may be provided by a dedicated boiler forming part of the steam processor.

According to the invention, the communication of the cooking chamber outlet with an ambient drain is controlled by a power operated valve assembly which preferably comprises a fluid pressure operated valve. When the pressure mode is desired, the operator activates this feature from an operator controlled panel, i.e., by a push button. Upon selecting the pressure mode, the fluid pressure operated valve is activated to terminate the communication of the chamber outlet with the ambient drain enabling the entering steam to pressurize the chamber. Preferably, the chamber is pressurized in the range of 10psi.

According to a feature of the invention, a door lock is provided which substantially inhibits opening of the access door when the cooking chamber is pressurized. In addition, the lock includes a dual latch feature so that in the event the door is opened while pressurized, the door will open to a position sufficient to vent pressure in the chamber but will engage a secondary latch structure to prevent the door from fully opening.

According to another feature of the invention, opening of the door is inhibited during the pressure mode of operation by a lock bar which blocks movement of a door opening latch member as long as the cooking chamber is under pressure.

According to the preferred and illustrated embodiment, during normal operation, the lock bar is moved into a locking position by a solenoid which is energized whenever the oven door is latched and the pressure mode is selected. In addition, a pressure responsive operating member maintains the locking member in the blocking position should the solenoid become inoperative while the chamber is still pressurized. With the disclosed arrangement, opening of the oven door is inhibited if the chamber is under pressure, even if power to the steam processor (which would deenergize the locking solenoid) is interrupted.

In the preferred arrangement, the pressure responsive member communicates with a pressure sensing conduit connected to the cooking chamber. The pressure sensing conduit is also connected to a pressure gauge for providing visual indication of the pressure in the chamber.

According to another feature of the invention, the actuator for terminating communication of the cooking chamber outlet with the ambient drain is controlled by a fluid pressure operated "pinch" valve. A valve of this type is available from the Red Valve Company of Carnegie, Pa. In the disclosed embodiment, the pinch valve is operated by water under pressure which is communicated to the pinch valve by a control valve that is activated when the pressure mode is selected by the operator. In the preferred arrangement, a conduit feeding pressurized fluid to the pinch valve also includes a restricted bleed located near a coupling that connects the feed conduit to the pinch valve. The restricted bleed allows a small quantity of water to move through the fluid coupling and provides some cooling for the pinch valve. It must be recognized that at least the end of the pinch valve nearest the chamber outlet may be exposed to substantial heat from the cooking chamber.

According to another feature of the invention the disclosed steam processor includes an improved steam condensing system which is operative to condense steam discharged into the drain during steam convection mode of operation. An example of a prior steam condensing apparatus is fully described in U.S. Pat. No. 4,011,805, which is hereby incorporated by reference. The apparatus creates a region of lower pressure (less than atmospheric) at the chamber outlet which facilitates the movement of condensate and steam from the cooking chamber. In the disclosed and preferred embodiment, the enhanced steam condensing system includes dual water spray nozzles for spraying a water mist or finely atomized water into a drain manifold that connects the chamber outlet to the ambient drain. In the preferred embodiment a primary nozzle is located in close proximity to the cooking chamber outlet and a secondary nozzle is located downstream of the outlet, preferably downstream of the pinch valve. During the steam convection mode of operation, both nozzles are activated and produce a pattern of finely divided water droplets which abruptly cool and condense any steam exhausted into the cooking chamber outlet and drain manifold, thus creating a subatmospheric pressure at the chamber outlet. With the disclosed arrangement substantially all of the steam discharged into the manifold is condensed.

It should be apparent that the disclosed dual mode steam processor is capable of a wide range of applications. In the disclosed cooking unit, two stacked cooking chambers are disclosed each having an associated supply of steam as well as associated control valving for controlling both the steam convection and steam pressure modes. An operator can easily switch the steam processor between steam convection and steam pressure modes by the manipulation of simple controls, preferably push buttons that form part of an operator control panel.

Additional features of the invention will become apparent and a fuller understanding obtained by reading the following detailed description made in connection with the accompanying drawings.

BEST MODE FOR CARRYING OUT THE INVENTION

Figure 1:
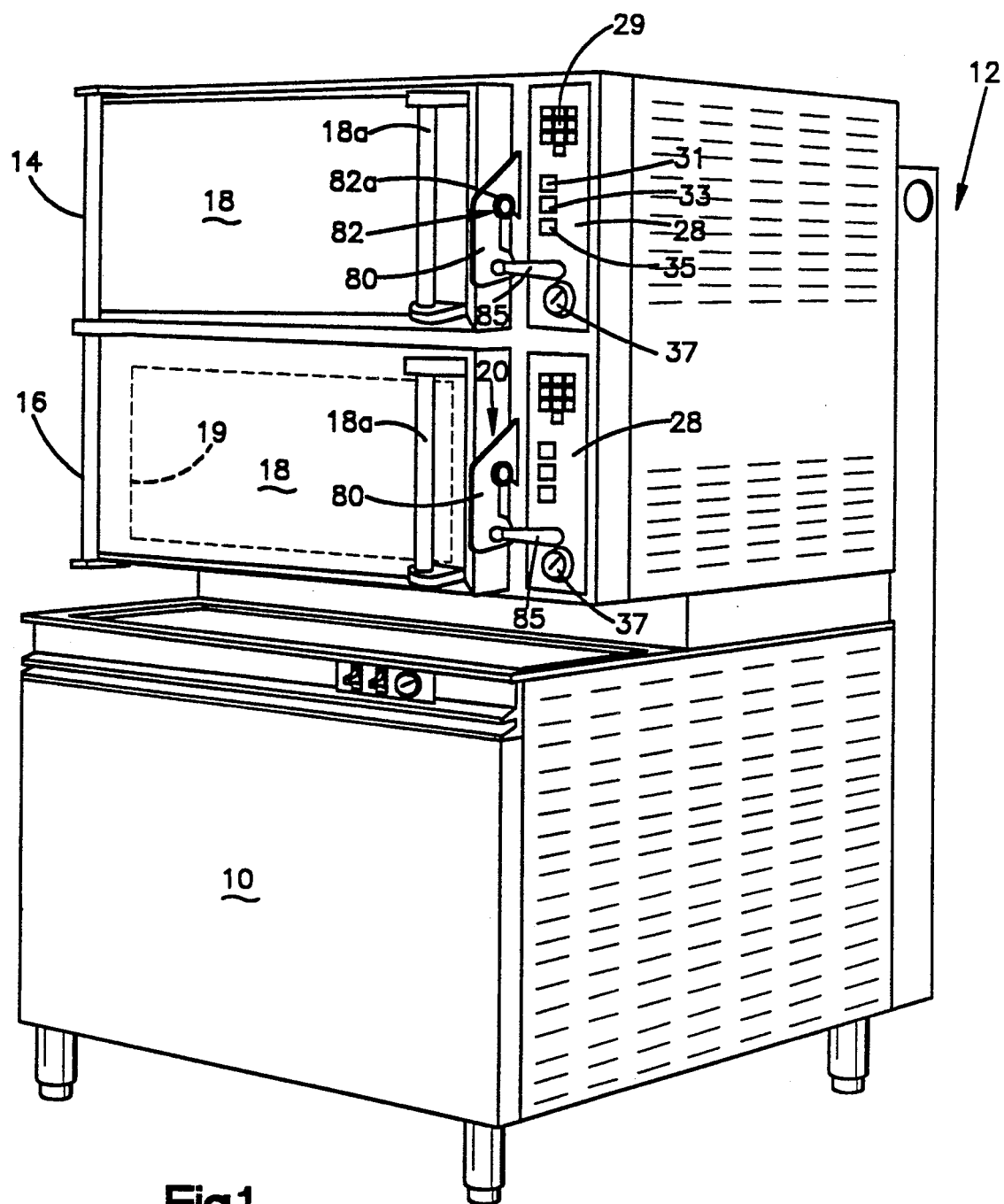
FIG. 1 is a perspective view of a steam processor constructed in accordance with a preferred embodiment of the invention.

FIG. 1 illustrates the overall construction of a steam processor for cooking/heating food items, embodying the present invention. The processor includes a base 10 which supports a cooking chamber assembly 12. In the illustrated embodiment, the cooking chamber assembly houses 12 two individual, insulated cooking chambers 14, 16. Each chamber includes an access door 18 mounting an associated operating handle 18a. A seal or gasket 19 (shown in phantom) is mounted to the inside of each door 18 and sealingly engages structure defining the cooking chamber. Each cooking chamber also includes a latch mechanism, indicated generally by the reference character 20 for maintaining closure of its associated access door during a cooking/heating operation.

The base 10 may have various configurations. In general the base 10 includes a steam generator unless potable steam is provided at the operating site. The steam generator may comprise a gas-fired or an electrically powered boiler. The base does not form part of the present invention and will not be described further.

Figure 2:
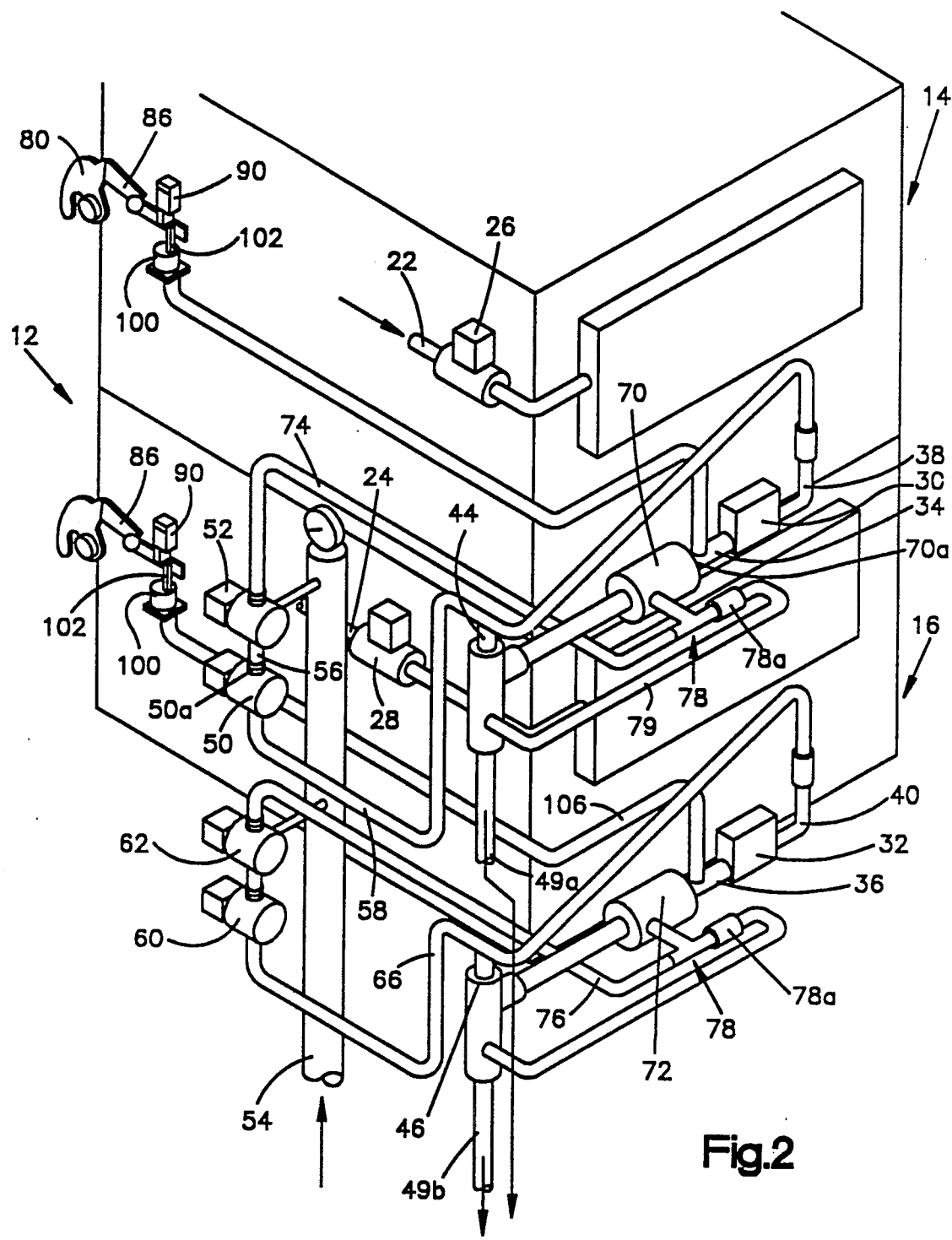
FIG. 2 is a fragmentary, schematic view of the steam processor shown in FIG. 1 with side and rear cover panels removed.

Referring also to FIG. 2, each of the cooking chambers 14, 16 is fed steam from an associated steam supply conduit 22, 24 under the control of respective solenoid valves 26, 28. The supply conduits 22, 24 are suitably connected to the source of steam located in the base 10.

Whenever the solenoid controlled valve 26 is activated, steam from the source (communicated to the supply pipe 22) will be fed into the upper cooking chamber 14. Similarly, whenever the solenoid control valve 28 is energized, steam will flow from the supply conduit 24 into the lower cooking chamber 16. Conventional controls, located on respective control panels 28 on the front of the steam processor unit, and associated circuitry (not shown) control the solenoid steam control valves 26, 28 and hence the communication of steam to the respective cooking chambers 14, 16. The controls may include a timer for automatically terminating the communication of steam after a predetermined time has lapsed. in the illustrated steam processor unit, a numeric keypad 29 is provided on each control panel and is used to enter the desired cooking time. In addition, each control panel 28 includes a push button 31 for activating the timed cooking cycle, a push button 33 for switching between the steam convection and steam pressure modes of operation and a push button 35 for manually activating and deactivating the cooking cycle for a given chamber. A pressure gauge 37 is also mounted on the control panel 28 a provides a visual indication of the pressure level in the cooking chamber when the unit is operated in the pressure mode.

Condensate and excess steam is discharged from each cooking chamber 14, 16 through respective chamber drain outlets 30, 32 (shown best in FIG. 2.) The drain outlets 30, 32 may comprise filtered apertures located at a low point in each cooking chamber. The outlets 30, 32 communicate with respective drain manifolds 34, 36.

In accordance with the invention, the steam processor is operable in either a steam convection or a steam pressure mode. In the steam convection mode, the cooking chambers communicate with substantially ambient pressure through their associated outlets 30, 32 and drain manifolds 34, 36. In order to enhance the convection steaming process, a region of subatmospheric pressure is created at each drain, when in the steam convection mode, by respective nozzles 38, 40. Each nozzle sprays a fine mist of water into the associated drain manifold to condense any steam discharged into the drain. The condensing of steam at the drain creates a region of low pressure at the drain to encourage the flow of steam throughout the cooking chamber. The function of the spray nozzles 38, 40 is more fully described in U.S. Pat. Nos. 4,011,805 and 4,281,636 which are both owned by the assignee of the present application and are hereby incorporated by reference. In accordance with the present invention, the spray nozzles 38, 40 form what are termed primary nozzles that provide the initial condensation of steam.

To further enhance the process, secondary nozzles 44, 46 associated with the chambers 14, 16, respectively, are located further downstream and insure that virtually all steam exhausted into the drain is condensed. Respective conduits 49a, 49b extending downstream from the secondary nozzles 44, 46 are suitably connected to a common drain (not shown). The communication of water to the spray nozzles 38, 44 (which operate to condense steam discharged by the upper cooking chamber 14), is controlled by a solenoid controlled valve 50 which is serially connected to a three way solenoid controlled valve 52. In the illustrated configuration, when the solenoid valve 52 is deenergized, water is communicated from a water supply pipe 54 to an inlet 50a of the solenoid valve 50 by way of a feed tube 56. If the solenoid valve 50 is energized (and the solenoid valve 52 is deenergized), water is supplied to the nozzles 38, 44 via the feed tube 56 and a common supply conduit 58 which is connected to both nozzles 38, 44. A similar pair of solenoid valves 60, 62 control the supply of water from the supply pipe 54 to a common conduit 66 which is connected to both the primary and secondary nozzles 40, 46 associated with the lower cooking chamber 16.

According to the invention, the steam processor is easily switched into a pressure mode in which cooking-/heating takes place at a pressure above atmospheric. In the illustrated steam processor, the source of steam is generally in the range of 10psi and hence when in the pressure mode, the cooking chamber rises to substantially the pressure of the steam source, i.e., in the range of 10psi.

The steam processor is switched to the pressure mode automatically upon selection of an appropriate control button (i.e. push button 33) on the control panel 28. The operator need not make any adjustments or changes in the steam processor itself. In order to enable pressurization of the cooking chamber, the communication of the cooking chamber drain outlet with the ambient drain must be terminated. In order to achieve this feature, the drain manifolds 34, 36 include respective shut-off valves 70, 72. Although various valves can be used, in the illustrated embodiment, "pinch" valves available from the Red Valve Company of Carnegie, Pa. are used. In general, these valves each include an elastomeric tube or tube section which defines a passageway through which drain communication is established. When a region around the elastomeric tube is pressurized, the tube collapses and constricts or completely blocks the passageway. In the illustrated embodiment, the pinch valve is operated by water pressure which is communicated to the respective pinch valves 70, 72 by conduits 74, 76. The communication of water from the supply pipe 54 to the pinch valve supply lines 74, 76 is controlled by the solenoid operated three-way valves 52, 62.

In the illustrated embodiment, when the valve 52 is energized, water from the supply pipe 54 is communicated to the pinch valve supply pipe 74 while water to the feed pipe 56 is terminated. Thus when the steam processor is operated in a pressure mode, the water supply to the spray nozzles 38, 44 is automatically terminated since the water which is normally directed to the spray nozzle control valve 50 is terminated. The pinch valve 72 associated with the lower cooking chamber 16 is controlled in a similar fashion by the solenoid valve 62.

According to a feature of the invention, a restricted bleed is provided at each pinch valve. The restricted bleed is provided by a fitting 78 that connects the pinch valve supply line 74 to the drain conduit 49a via drain line 79. The fitting 78 includes a restricted passage or orifice to substantially restrict the flow of water to the drain. This restricted flow provides cooling for the pinch valve 70. It must be noted that at least the upstream end 70a of the pinch valve is exposed to heat from the cooking chamber 14. The restricted bleed provides a means for carrying away at least some of the heat transferred to the valve 70. A similar arrangement is used with the pinch valve 72.

Figure 3:
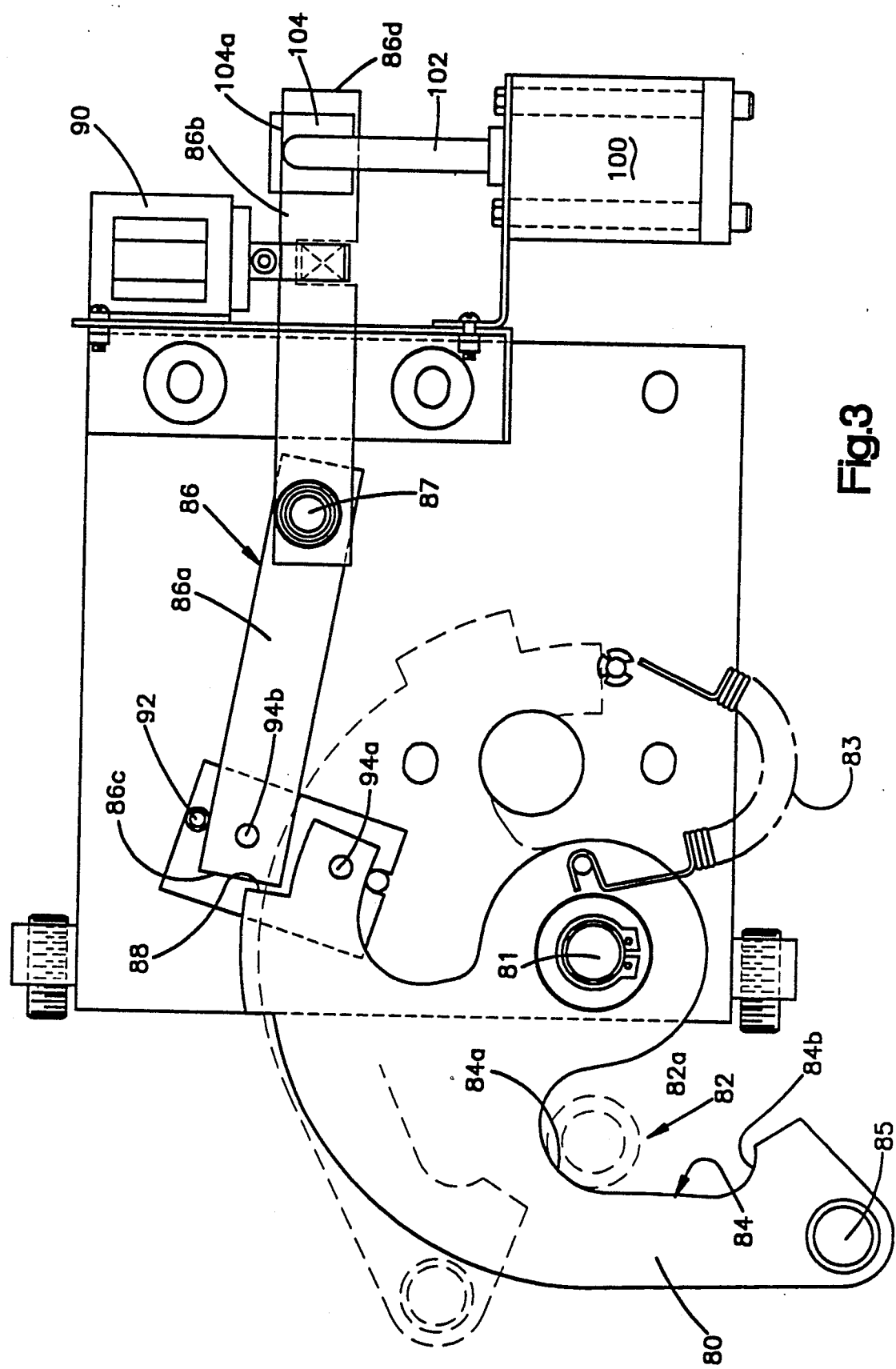
FIG. 3 is a side elevational view of a latch mechanism forming part of the steam processor; and, FIG. 4 is a plan view of the latch mechanism shown in FIG. 3.
Figure 4:
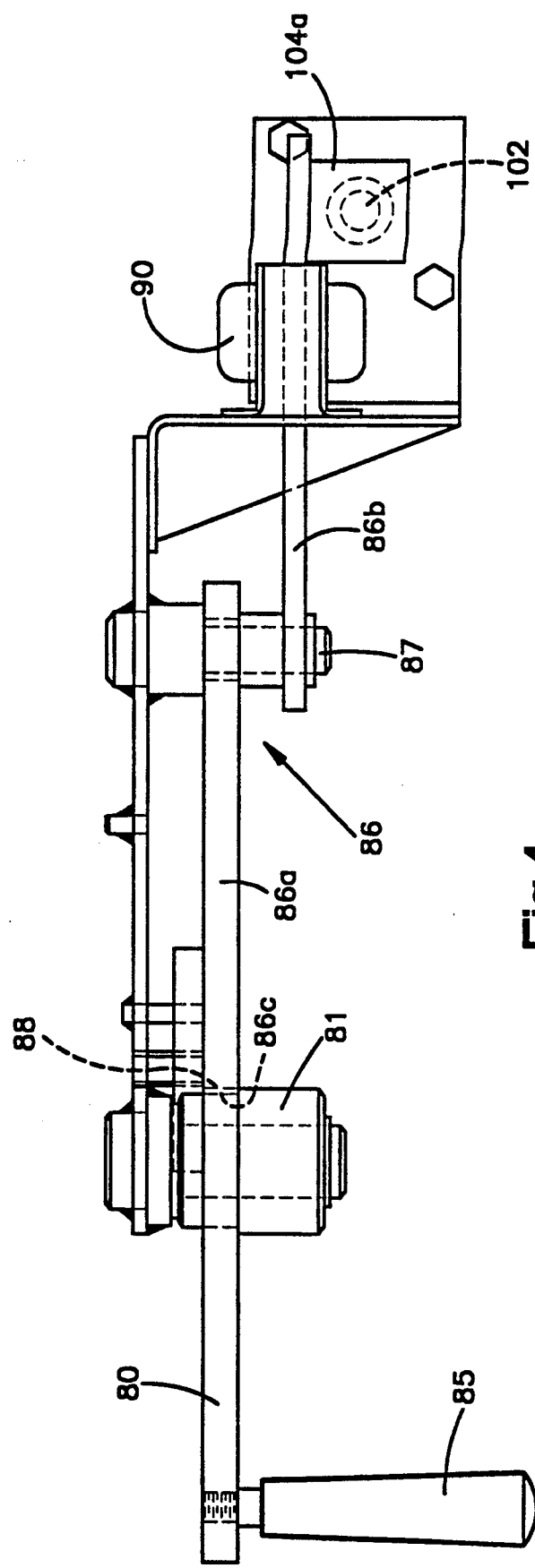

Turning now to FIGS. 2, 3 and 4, the steam processor includes a latch assembly which automatically locks to inhibit opening of the access door, whenever the cooking chamber is pressurized. The same latch mechanism is used for both cooking chambers 14, 16 so only the one associated with the upper chamber 14 will be described. Referring also to FIG. 1, the latch mechanism includes a pivotally mounted latch member 80 which is engageable with a latch pin 82 (shown in FIG. 1) when the access door 18 is closed. The latch pin 82 may mount a roller 82a. The latch member 80 is pivotally mounted to a pivot 81 and is spring biased towards an open position by a tension spring 83. An operating handle 85 is attached to the side of the member 80. In normal operation, the access door is closed by the operator and the latch member 80 rotated downwardly (i.e. counter-clockwise as viewed in FIG. 3) to engage the latch pin 82. The latch member 80 defines a vertical (as viewed with the latch member in the locked position), elongated slot 84 including an upper, arcuate locking segment 84a which defines a detent position for the latch pin 82. When the latch member 80 is rotated to its full downward position, the latch pin 82 engages the arcuate segment 84a.

In accordance with the invention, after the latch member 80 is rotated to its locked position, and the cooking chamber pressurized, a locking bar 86 is moved into a confronting position with respect to an abutment surface 88 defined by the latch member 80. The locking bar 86 comprises two offset links 86a, 86b fixed together to prevent relative movement. The locking bar 86 is pivotally mounted to a pivot 87.

As seen best in FIG. 3, when the locking bar 86 is rotated to the illustrated position, clockwise rotation of the latch member 80 is inhibited (as viewed in FIG. 3). In particular, the latch member abutment surface 88 will contact an end face 86c of the locking bar 86 if the latch member 80 is rotated clockwise. In short, rotative movement of the latch member 80 in the opening direction will be blocked when the locking bar 86 is in the position shown in FIG. 3. According to the invention, the locking bar 86 is moved to the locking position shown in FIG. 3 by a solenoid 90. When the pressure mode of operation is selected and the latch member 80 is rotated to its locked position at which it engages the latch pin 82, the solenoid 90 is automatically energized and pivots the locking bar 86 to the blocking position shown. A sensor assembly 92, indicated somewhat schematically, includes one or more proximity detectors and senses the locked position of the latch member 80. It may also sense the proper positioning of the locking bar 86. Magnets 94a, 94b mounted to the latch member 80 and the locking bar 86 are used to actuate the individual proximity detectors located in the assembly 92. In the preferred embodiment, the cooking chamber is not allowed to pressurize until the proper positioning of the latch member 80 and the locking bar 86 are detected by the sensor 92.

According to another feature of the invention, the locking bar 86 is maintained in its blocking position, as long as the cooking chamber is pressurized even if the solenoid 90 is deenergized due to component malfunction or power failure. Referring also to FIG. 2, a pressure responsive actuator 100 is located below a right end 86d (as viewed in FIG. 3) of the locking bar 86 and includes an actuating rod 102. As seen best in FIG. 3, a horizontal plate 104a, preferably forming part of an L-shaped bracket 104 is secured to the right distal end of the locking bar 86. The plate 104a is engageable by the actuator rod 102 whenever the rod extends. The actuator 100 communicates with the outlet drain 30 by way of a sensing tube 106. Whenever the pinch valve 70 is actuated to terminate the communication of the cooking chamber with the ambient drain, the cooking chamber and associated drain plumbing upstream of the pinch valve 70 will pressurize. In short, the sensor tube 106 will be at substantially the same pressure as the cooking chamber. The pressure in the cooking chamber is thus communicated to the actuator 100 which causes the actuating rod 102 to rise in response to the sensed pressure. The extension of the actuating rod 102 to the position shown in FIG. 3 prevents the locking bar 86 from rotating counter clockwise as long as a pressure above a predetermined threshold is present in the cooking chamber, even if the solenoid 90 is deenergized. As a result, the latch member 80 cannot be rotated clockwise to release the access door until pressure in the cooking chamber has decreased below a predetermined level at which time the actuating rod 102 will retract into the actuator 100. With the present invention, an operator cannot open the access door when the cooking chamber is under pressure even if a failure in the solenoid 90 occurs or a power failure interrupts electrical power to the steam processor.

According to another feature of the invention, the construction of the latch member 80 inhibits the abrupt opening of the access door should some residual pressure be present in the cooking chamber. As indicated above, the latch member 80 defines a somewhat vertical, elongated slot 84 (as viewed with the latch member in its locked position). In the normal locked position, the latch pin 82 engages the arcuate segment 84a. If the latch 80 is rotated in the clockwise direction and a residual pressure exists in the cooking chamber, the access door will attempt to pop open. However, the latch pin 82 (forming part of the access door) will then engage a lower arcuate segment 84b which will prevent the access door from opening in an uncontrolled fashion. In short, the door will open a sufficient amount to release the residual pressure in the chamber but will be maintained in the nearly closed position by the latch member 80 by virtue of the engagement of the latch pin 82 with the lower slot segment 84b.

Although the invention has been described with a certain degree of particularity, it should be understood that those skilled in the art can make various changes to it without departing from the spirit or scope of the invention as hereinafter claimed.

We claim:

1. A steam processor for use in the preparation of food or the like, capable of operating in either a steam convection mode or a steam pressure mode, comprising:
   (a) an enclosed, insulated cooking chamber for heating food items placed in said chamber by contact with steam, having a steam inlet and an outlet for discharging steam and condensate said outlet operative to substantially continuously discharge steam and condensate during a steam convection mode of operation;
   (b) door means for providing access to the interior of said cooking chamber;
   (c) steam control means controlling the communication of steam from a steam source to the steam inlet, during both a steam convection mode and a steam pressure mode of operation;
   (d) pressurizing means for operating said cooking chamber at a pressure above atmospheric including:
   (i) seal means for sealing said door means; and
   (j) drain control means including a fluid pressure operated valve for controlling the communication of said steam outlet with a drain at atmospheric, said drain control means operative to terminate communication between said steam outlet and said drain when a predetermined fluid pressure is applied to said fluid pressure operated valve, whereby said cooking chamber is allowed to pressurize to a pressure above atmospheric.

2. The apparatus of claim 1 wherein said door means includes a locking arrangement including a pressure responsive member for blocking movement in a door opening latch member when said chamber is above a predetermined pressure.

3. The apparatus of claim 2 wherein said door means includes a dual latch means which allows a cooking chamber access door to open a sufficient distance to vent pressure in said chamber while preventing further opening of said door until a latch member is moved to a further open position.

4. The apparatus of claim 1 wherein said door means includes a locking means for inhibiting opening of said door means when said cooking chamber is above a predetermined pressure, said locking means including a solenoid operated locking member which is moved into a blocking position when a pressurized cooking mode is selected.

5. The apparatus of claim 4 wherein said locking means further includes a pressure responsive member which monitors pressure in said cooking chamber and maintains said locking member in the blocking position as long as said cooking chamber is above a predetermined pressure.

6. The apparatus of claim 5 wherein said pressure responsive member monitors said cooking chamber pressure through a pressure sensing conduit connected to a drain manifold communicating with said chamber outlet.

7. The apparatus of claim 4 wherein said locking means includes a lock maintaining means operative to maintain said locking member at its blocking position while said chamber is above a predetermined pressure.

8. The apparatus of claim 7 wherein said maintaining means comprises a pressure responsive actuator including an operating member which maintains said locking member in its blocking position when said chamber is above a predetermined pressure.

9. The apparatus of claim 8 wherein said locking means includes a dual latch means which allows a cooking chamber access door to open a sufficient distance to vent pressure in said chamber while preventing further opening of said door until a latch member is moved to a further open position.

10. The apparatus of claim 1 further comprising a steam condensing means including a pair of water injecting nozzles, one of said nozzles located in close proximity to said steam outlet and the other of said nozzles located near a downstream end of said fluid pressure operated drain control means.

11. The apparatus of claim 1 wherein said fluid pressure operated valve comprises a fluid pressure operated pinch valve.

12. The apparatus of claim 1 wherein said door means includes a dual locking arrangement including an actuating member for moving a blocking means into blocking engagement with a latch means and a lock maintaining means operative to maintain said blocking means in its blocking position as long as the cooking chamber is above a predetermined pressure.

13. The apparatus of claim 1 wherein said fluid pressure operated valve is water pressure operated.

14. A steam processor capable of operating in steam convection and steam pressure modes, comprising:
   (a) a housing defining at least one enclosed, insulated cooking chamber for heating food items placed in said chamber by contact with steam, said chamber having a steam inlet and an outlet for discharging steam and condensate said outlet operative to substantially continuously discharge steam and condensate during a steam convection mode of operation;
   (b) door means for providing access into the interior of said cooking chamber;
   (c) steam control means for controlling the communication of steam from a steam source to the steam inlet, during both a steam convection mode and a steam pressure mode of operation;
   (d) drain manifold means connecting said steam outlet with an ambient drain;
   (e) drain shut-off means disposed in a drain flow path intermediate said steam outlet and said ambient drain;
   (f) means for activating said drain shut-off means when a pressure mode of operation is selected by an operator.

15. The apparatus of claim 14 wherein said drain shutoff means comprises a fluid pressure operated pinch valve including an elastomeric member defining a collapsible passageway forming part of said drain flow path.

16. The apparatus of claim 15 further comprising a first water control means operative to communicate water under pressure to said pinch valve when the pressure mode of operation is desired.

17. The apparatus of claim 16 further comprising steam condensing means including a first water spray nozzle located near said steam outlet and a second water spray nozzle located near an output end of said pinch valve, said first and second nozzles emitting a water mist into said drain manifold means when said cooking chamber is operating in a steam convection mode.

18. The apparatus of claim 17 including a conduit means for communicating water from said first water control means to said pinch valve, said conduit means further including a restricted bleed passage located near a coupling connecting a conduit segment to said pinch valve, said restrictive bleed operative to allow a predetermined quantity of water to flow through said coupling when said pinch valve is activated whereby cooling is provided.

19. The apparatus of claim 18 wherein the communication of water to said first and second spray nozzles is controlled by a second water control means.

20. The apparatus of claim 19 wherein said first water control means comprises an electrically operated three-way valve having its input connected to a source of water, one of its output ports connected to said conduit segment and another of its outputs connected to the input of said second water control means such that when said first water control means is deenergized, said water source is communicated to the input of said second water control means.

21. The apparatus of claim 20 wherein said door means includes a locking arrangement including a pressure responsive member for blocking movement in a door opening latch member when said chamber is above a predetermined pressure.

22. A steam processor for use in the preparation of food or the like, comprising:
   (a) an enclosed, insulated cooking chamber for heating food items placed in said chamber by contact with steam, having a steam inlet and an outlet for discharging steam and condensate;
   (b) door means for providing access to the interior of said cooking chamber;
   (c) steam control means for controlling the communication of steam from a steam source to the steam inlet;
   (d) pressurizing means for operating said cooking chamber at a pressure above atmospheric including:
      (i) seal means for sealing said door means; and,
      (ii) drain control means including a fluid pressure operated valve for controlling the communication of said steam outlet with a drain at atmospheric;
   (e) said door means further including:
      (i) a locking arrangement having a pressure responsive member for blocking movement in a door opening latch member when said chamber is above a predetermined pressure; and,
      (ii) a dual latch means which allows a cooking chamber access door to open a sufficient distance to vent pressure in said chamber while preventing further opening of said door until said latch member is moved to a further open position.

23. A steam processor for use in the preparation of food or the like, comprising:
   (a) an enclosed, insulated cooking chamber for heating food items placed in said chamber by contact with steam, having a steam inlet and an outlet for discharging steam and condensate;
   (b) door means for providing access to the interior of said cooking chamber, said door means including a locking means for inhibiting opening of said door means when said cooking chamber is above a predetermined pressure; '(c) steam control means for controlling the communication of steam from a steam source to the steam inlet;
   (d) pressurizing means for operating said cooking chamber at a pressure above atmospheric including:
      (i) seal means for sealing said door means; and,
      (ii) drain control means including a fluid pressure operated valve for controlling the communication of said steam outlet with a drain at atmospheric;
   (e) said locking means including:
      (i) a solenoid operated locking member which is moved into a blocking position when a pressurized cooking mode is selected; and,
      (ii) a pressure responsive member which monitors pressure in said cooking chamber and maintains said locking member in the blocking position as long as said cooking chamber is above a predetermined pressure, said pressure responsive member monitoring said cooking chamber pressure through a pressure sensing conduit connected to a drain manifold communicating with said chamber outlet.

24. A steam processor for use in the preparation of food or the like, comprising:

(a) an enclosed, insulated cooking chamber for heating food items placed in said chamber by contact with steam, having a steam inlet and an outlet for discharging steam and condensate;
(b) door means for providing access to the interior of said cooking chamber;
(c) steam control means for controlling the communication of steam from a steam source to the steam inlet;
(d) pressurizing means for operating said cooking chamber at a pressure above atmospheric including:
  (i) seal means for sealing said door means; and,
  (ii) drain control means including a fluid pressure operated valve for controlling the communication of said steam outlet with a drain at atmospheric;
(e) said door means including a dual locking arrangement having an actuating member for moving a blocking means into blocking engagement with a latch means and a lock maintaining means operative to maintain said blocking means in its blocking position as long as the cooking chamber is above a predetermined pressure.

25. The apparatus of claim 24 wherein said lock maintaining means comprises a pressure responsive member which extends into operative engagement with said blocking means when said cooking chamber is above a certain pressure.

26. A steam processor for use in the preparation of food or the like, capable of operating in either a steam convection mode or steam pressure mode, comprising:
(a) an enclosed, insulated cooking member for heating food items placed in said chamber by contact with steam, having a steam inlet and an outlet for discharging steam and condensate said outlet operative to substantially continuously discharge steam and condensate during a steam convection mode of operation;
(b) door means for providing access to the interior of said cooking chamber;
(c) steam control means for controlling the communication of steam from a steam source to the steam inlet, during both a steam convection mode and a steam pressure mode of operation;
(d) pressurizing means for operating said cooking chamber at a pressure above atmospheric including:
  (i) seal means for sealing said door means; and
  (ii) drain control means including a water pressure operated valve for controlling the communication of said steam outlet with a drain at atmospheric.

27. A steam processor for use in the preparation of food or the like, capable of operating in either a steam convection mode or a steam pressure mode, comprising:
(a) an enclosed, insulated cooking chamber for heating food items placed in said chamber by contact with steam, having a steam inlet and an outlet for discharging steam and condensate said outlet operative to substantially continuously discharge steam and condensate during a steam convection mode for operation;
(b) door means for providing access to the interior of said cooking chamber;
(c) steam control means for controlling the communication of steam from a steam source to a steam inlet, during both a steam convection mode and a steam pressure mode of operation;
(d) pressurizing means for operating said cooking chamber at a pressure above atmospheric including:
  (i) seal means for sealing said door means; and,
  (ii) drain control means including a fluid pressure operated shut-off valve having a elastomeric member defining a collapsible passage way connecting said steam outlet to an ambient drain for controlling the communication of said steam outlet with said drain, said drain control means operative such that when a predetermined fluid pressure is applied to said valve, said elastomeric member collapses to substantially isolate said steam outlet from said drain.

28. A steam processor for use in the preparation of food or the like, comprising:
(a) an enclosed, insulated cooking chamber for heating food items placed in said chamber by contact with steam, having a steam inlet and an outlet for discharging steam in condensate;
(b) door means for providing access to the interior of said cooking chamber, said door means including:
  (i) a locking means for inhibiting opening of said door means when said cooking chamber is above a predetermined pressure, said locking means including a solenoid operated locking member which is moved into a blocking member position when a pressurized cooking mode is selected; and,
  (ii) a dual latch means which allows a cooking chamber access door to open a sufficient distance to vent the pressure in said door until a latch member is moved to a further open position.
(c) steam control means for controlling the communication of steam from a steam source to the steam inlet;
(d) pressurizing means for operating said cooking chamber at a pressure above atmospheric, including:
  (i) seal means for sealing said door means; and,
  (ii) drain control means including a fluid pressure operated valve for controlling the operation of said steam outlet with a drain at atmospheric, said drain control means operative to terminate communication between said steam outlet and said drain when a predetermined fluid pressure is applied to said fluid pressure operated valve, whereby said cooking chamber is allowed to pressurize to a pressure above atmospheric.

29. A steam processor for use in the preparation of food or the like, comprising:
(a) an enclosed, insulated cooking chamber for heating food items placed in said chamber by contact with steam, having a steam inlet and an outlet for discharging steam and condensate
(b) door means for providing access to the interior of said cooking chamber, said door means including a locking means for inhibiting opening of said door means when said cooking chamber is above a predetermined pressure, said locking means including a solenoid operated locking member which is moved into a locking position when a pressurized cooking mode is selected, said locking means further including a pressure responsive member which monitors pressure in said cooking chamber and maintains said locking member in the blocking position as long as said cooking chamber is above a predetermined pressure, said pressure responsive member monitoring said cooking chamber pressure through a pressure sensing conduit connected to a drain manifold communicating with said chamber outlet;

(c) steam control means for controlling the communication of steam from a steam source to the steam inlet;

(d) pressurizing means for operating said cooking chamber at a pressure above atmospheric, including:

(i) seal means for sealing said door means; and, (ii) drain control means including a fluid pressure operated valve for controlling the communication of said steam outlet which a drain at atmospheric, said drain control means operative to terminate communication between said steam outlet and said drain when a predetermined fluid pressure is applied to said fluid pressure operated valve, whereby said cooking chamber is allowed to pressurize to a pressure above atmospheric.

30. A steam processor capable of operating in convection and pressure modes, comprising:

(a) a housing defining a least 1 closed, insulated cooking chamber for heating food items placed in said chamber by contact with steam, said chamber having a steam inlet and an outlet for discharging steam and condensate;

(b) door means for providing access into the interior of said cooking chamber;

(c) steam control means for controlling the communication of steam from a steam source to the steam inlet;

(d) drain manifold means connecting said steam outlet with an ambient drain;

(e) drain shut-off means disposed in a drain flow path intermediate said steam outlet and said ambient drain;

(f) means for activating said drain shut-off means when a pressure mode of operation is selected by an operator, said drain shut-off means comprising a fluid pressure operated pinch valve including elastomeric member defining a collapsible passageway forming part of said drain and flow path;

(g) a first water control means operative to communicate water under pressure to said pinch valve when the pressure mode of operation is desired;

(h) steam condensing means including a first water spray nozzle located near said steam outlet and a second water spray nozzle located near an output end of said pinch valve, said first and second nozzles emitting a water mist into said drain manifold means when said cooking chamber is operating in a convection mode;

(i) a conduit means for communicating water from said first water control means to said pinch valve, said conduit means further including a restricted bleed passage located near a coupling connecting a conduit segment to said pinch valve, said restricted bleed operative to allow predetermined quantity of water to flow through said coupling when said pinch valve is activated whereby cooling is provided.

31. The apparatus of claim 30 wherein the communication of water to said first and second spray nozzles is controlled by a second water control means.

32. The apparatus of claim 31 wherein said first water control means comprises an electrically operated three-way valve having its input connected to a source of water, one of its output ports connected said to said conduit segment and another of its outputs connected to the input of said second water control means such that when said first water control means is de-energized, said water source is communicated to the input of said second water control means.

33. The apparatus of claim 32 wherein said door means includes a locking arrangement including a pressure responsive member for blocking movement in a door opening latch member when said chamber is above a predetermined pressure.

34. A steam processor for use in the preparation of food or the like, comprising:

(a) an enclosed, insulated cooking chamber for heating food items placed in said chamber by contact with steam, having a steam inlet and an outlet for discharging steam and condensate;

(b) door means for providing access to the interior of said cooking chamber, said door means including a dual locking arrangement including an actuating member for moving a blocking means into blocking engagement with a latch means and a lock maintaining means operative to maintain said blocking means in its blocking position as long as the cooking chamber is above a predetermined pressure;

(c) steam control means for controlling the communication of steam from a steam source to the steam inlet;

(d) pressurizing means for operating said cooking chamber at a pressure above atmospheric including:

(i) seal means for sealing said door means; and, (ii) drain control means including a fluid pressure operated valve for controlling the communication of said steam outlet with a drain at atmospheric, said drain control means operative to terminate communication between said steam outlet and said drain when a predetermined fluid pressure is applied to said fluid pressure operated valve, whereby said cooking chamber is allowed to pressurize to a pressure above atmospheric.

35. A steam processor for use in the preparation of food or the like, comprising:

(a) an enclosed, insulated cooking chamber for heating food items placed in said chamber by contact with steam, having a steam inlet and an outlet for discharging steam and condensate;

(b) door means for providing access to the interior of said cooking chamber, said door means including a locking means for inhibiting opening of said door means when said cooking chamber is above a predetermined pressure, said locking means including a solenoid operated locking member which is moved into a blocking position when a pressurized cooking mode is selected, said locking means including a lock maintaining means operative to maintain said locking member at its blocking position while said chamber is above a predetermined pressure, said maintaining means comprising a pressure responsive actuator including an operating member which maintains said locking member in its blocking position when said chamber is above a predetermined pressure, said locking means including a dual latch means which allows a cooking chamber access door to open a sufficient distance to vent pressure in said chamber while preventing further opening of said door until a latch member is moved to a further open position;
(c) steam control means for controlling the communication of steam from a steam source to the steam inlet;
(d) pressurizing means for operating said cooking chamber at a pressure above atmospheric, including:
  (i) seal means for sealing said door means; and
  (ii) drain control means including a fluid pressure operated valve for controlling the communication of said steam outlet with a drain at atmospheric, said drain control means operative to terminate communication between said steam outlet and said drain when a predetermined fluid pressure is applied to said fluid pressure operated valve, whereby said cooking chamber is allowed to pressurize to a pressure above atmospheric.

* * * * *